United States Patent [19]

Tanaka et al.

[11] Patent Number: 5,052,156
[45] Date of Patent: Oct. 1, 1991

[54] FLOORING PANEL SYSTEM

[75] Inventors: Haruo Tanaka; Hideaki Tambo; Kazuhiko Kise, all of Fukui, Japan

[73] Assignee: 501 Fukuvi Chemical Industry Co., Ltd., Fukui, Japan

[21] Appl. No.: 597,896

[22] Filed: Oct. 15, 1990

[51] Int. Cl.$^5$ ............................................. F16B 39/30
[52] U.S. Cl. .................................. 52/126.6; 411/411; 411/310
[58] Field of Search .......................... 52/126.6, 126.7; 411/310, 311, 324, 309, 308

[56] References Cited

U.S. PATENT DOCUMENTS 3,882,917  5/1975  Orlomoski ........................ 411/309
4,059,932  11/1977  Resch ................................. 52/81

Primary Examiner—Richard E. Chilcot, Jr.
Assistant Examiner—Wynn Wood
Attorney, Agent, or Firm—Kane Dalsimer Sullivan Kurucz Levy Eisele and Richard

[57] ABSTRACT

A flooring system comprising a flooring panel having a panel body, and detachable support legs is disclosed. The panel body has a set of threaded holes having internal threads of a given pitch extending uniformly throughout the hole (the regular threads). One end of the detachable support legs is provided with a threaded section having two types of external threads of the identical pitch to the internal threads; one type is the regular threads and the other type has the crest of each thread wider than the crest of the regular threads, and the wider crest is formed with a slit extending continuously on the tip of each crest (the split threads). At least the leading end the threaded section of the leg is provided with the regular threads. The placement of the regular and split-threads can be reversed on the panel body and on the threaded section of the leg, to achieve the same purpose of providing firm and efficient locking system. Such a flooring system is convenient and cost efficient for the construction of a double-floor structure required in modern automated office buildings.

4 Claims, 6 Drawing Sheets

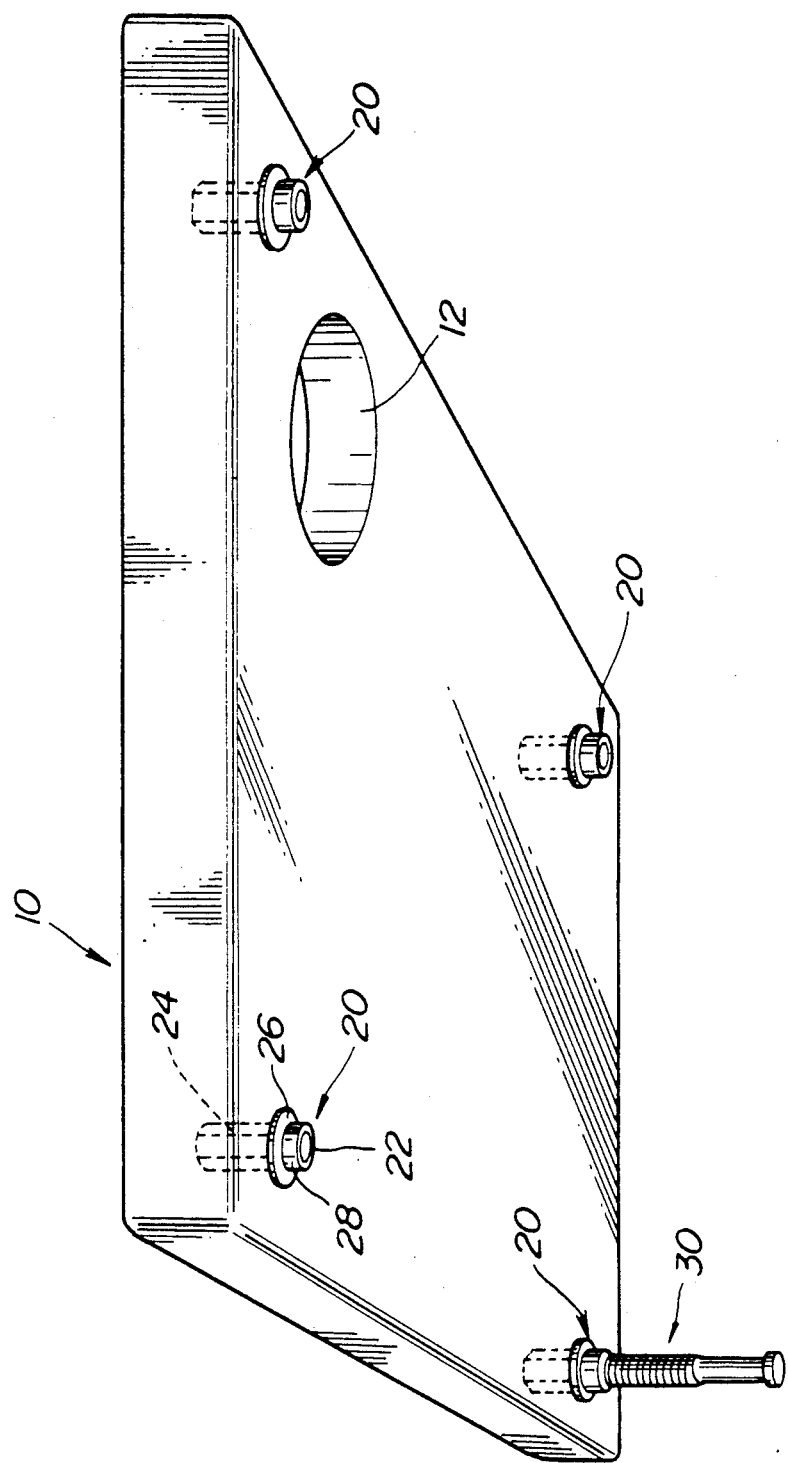

FLOORING PANEL SYSTEM

FIELD OF THE INVENTION

This invention relates to an improved flooring system for a double-floor construction of floors in computer rooms and other automated office buildings.

BACKGROUND ART

Double-flooring panels presently available, described in a Japanese Laid Open No. S62-107044 for example, employs a technique of embedding threaded nuts around the bottom peripheries for the attachment of threaded support legs to the nuts. The separation height between the flooring panel and the foundation floor can be adjusted by rotating the leg component to change the section length which projects out from the flooring panel.

Such an arrangement is susceptible to loosening of the legs due to rotation of the legs caused by mechanical disturbance such as vibrations. To circumvent such problems, there have been attempts to prevent the leg rotation by means of additional component devices such as spring washers. In recent years, there have been attempts to eliminate such extra components by having elastically-loaded threads on the legs, as disclosed in Patent Gazette No. S56-19492, which are provided with slitted threads whose crests are slightly wider than those of the conventional threads. These threads prevent loosening of the support legs by the elastic spring-back action of the wider threads when threaded into regularly spaced threads of the receiving nuts in the flooring component.

This type of threading arrangement presents problems during on-site installation of the legs. That is, initial threading of the leg into the nut must be performed with care, because of a danger of threading into the opening of the split thread. If such cross threading is continued forcefully, it will cause tearing of the split crests, and ultimately lead to destruction of the threads on both nut and support leg, making further adjustments impossible. Therefore, the installation operation must be carried out with careful visual attention, and this is an undesirable factor which lowers productivity.

SUMMARY OF THE INVENTION

An object of the present invention is to provide a fastening system comprising a flooring panel and detachable support legs which can be fastened and unfastened efficiently to provide secure and detachable connection between the flooring panel and the support leg, without damaging split-threads or using additional components.

According to this invention, a group of regular-threads (hereinafter referred to as regular-threads) is provided on at least the leading end of the threaded portion of the support leg, followed by a second group of threads with wider crests having a continuous slit formed at the crest (hereinafter referred to as split-threads).

Further aspect of this invention concerns the mating threaded hole of said panel, which part is provided with regular-threads on at least the entry section of said hole followed, further in the interior of the threaded hole, by a second group of split-threads.

According to this invention, threading of said detachable leg into said mating threaded hole can be initiated without fear of damaging the split threads, because both sets of threads are of the regular-thread type at their respective initiation portions and therefore do not cause a crest of a regular-threads to bite into the opening of a split-thread. Continued threading of the leg into the mating nut causes the split-threads to thread into the regular thread of the mating nut component to provide secure locking action.

BRIEF DESCRIPTION OF THE DRAWINGS

FIG. 2 is an oblique bottom view of a flooring panel to which said support leg is fastened.

DETAILED DESCRIPTION OF THE PREFERRED EMBODIMENTS OF THE PRESENT INVENTION

A first embodiment of this invention will be explained with reference to FIG. 2.

The primary constituents of the matrix material of the floor panel 10 comprise magnesium carbonate, gypsum slag, calcium silicate and other light weight ceramic substances of good castability and formability, together with cement and other supplementary hardening constituents. The matrix is reinforced with chopped fibrous additives from aromatic polyamide group (aramid fibers) such as poly-p-phenylene terephthalamide or polybenzamide or glass fibers. The overall shape is roughly square and is provided with access through-holes 12 for wiring. Other structural details will be explained further in the following.

Figure 3:
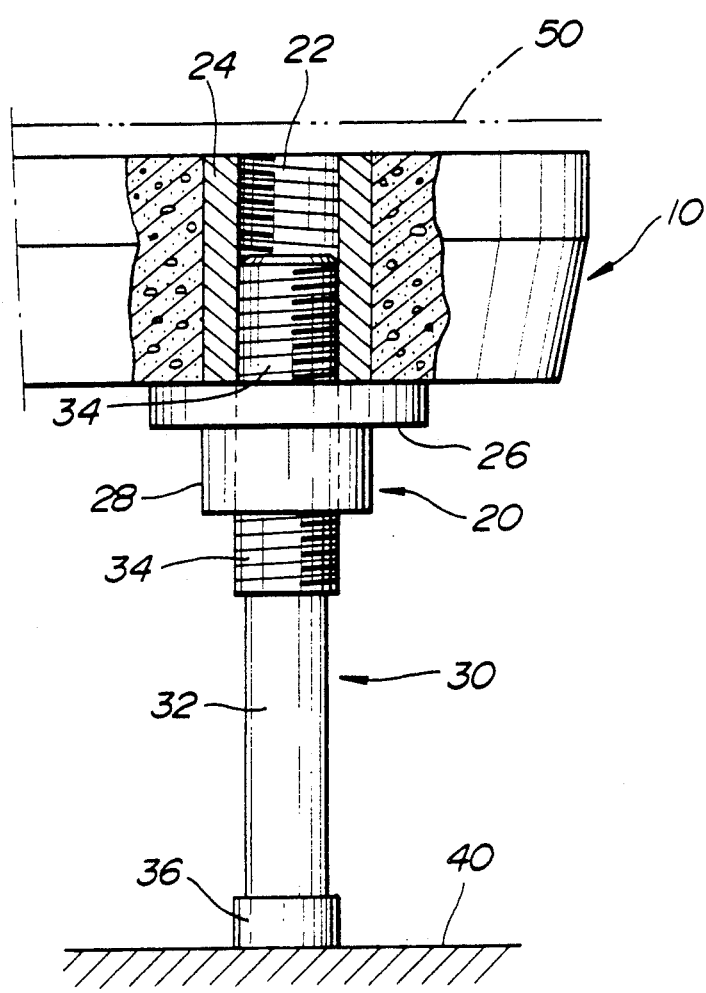
FIG. 3 is a cross sectional view showing said leg screwed into a mating part of said floor panel.

As shown in FIG. 3, a net-component 20 is embedded integrally at each of the four corners of the panel body 10. The nut-component 20 comprises a hexagonal columnar part 24, a flange 26, a cylindrical part 28, within which part an internally threaded section 22 is disposed through the thickness of the panel body 10. Said hexagonal part 24 is disposed in such a way that the support leg 30 can access the threaded hole 22 from either the top or the bottom of said panel, for attachment to the panel body 10.

Figure 1A:
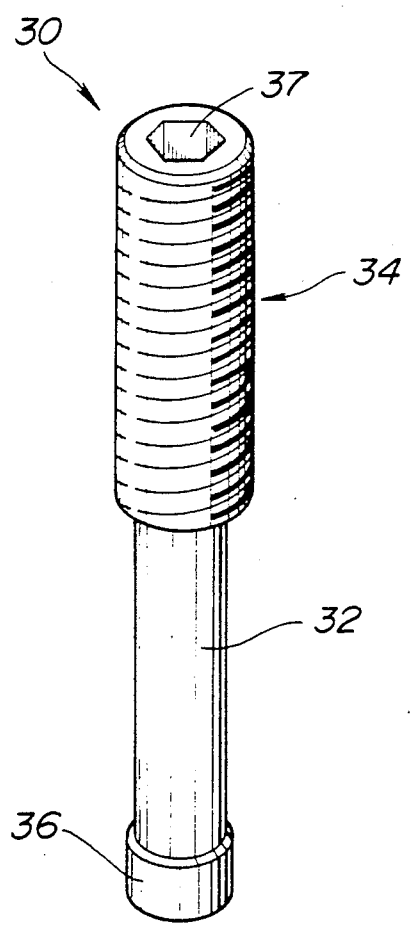
FIG. 1(a) is an oblique view of the entire section of a support leg in a first preferred embodiment.
Figure 1B:
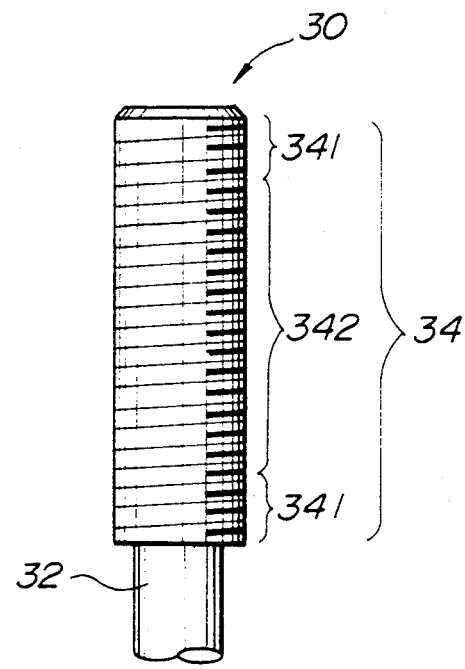
FIG. 1(b) is a front view of the threading part of the support leg.

As shown in FIGS. 1(a) and (b), this support leg 30 has a main axis 32, and on the top section of this leg is an externally threaded section 34 (hereinafter referred to as threaded section 34) to mate with said internally threaded hole 22 (hereinafter referred to as threaded hole), and on the end portion is provided a suitable cavity 37 to accept a tool for turning said leg. On the opposite end of the leg 34 is attached a rubber component 36. As shown in FIG. 3, a double floored structure comprises a panel system, comprising the support legs 30 attached to the panel body 10 by means of the nut component 20, laid on top of a lower base floor surface 40. In this figure, reference number 50 designates a floor covering such as carpet.

Figure 4:
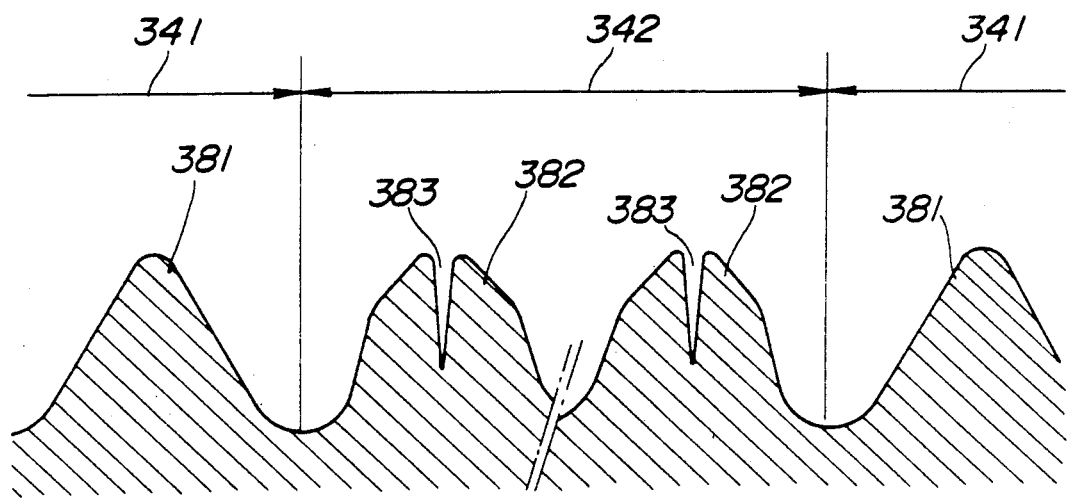
FIG. 4 is an enlarged cross sectional view of a threading arrangement of said leg before attachment.
Figure 5:
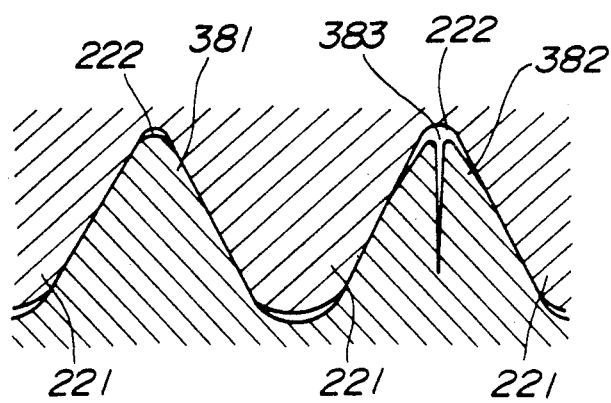
FIG. 5 is an enlarged cross sectional view to explain the elastic spring action of the threading system of the first preferred embodiment.

The construction feature of the threaded section 34 is explained with reference to FIG. 4, which shows a possible arrangement of the two types of threads; regular-thread section 341 and the split-thread section 342.

The regular-threads 381 are disposed on the leading and trailing portions of the threaded section 34. On the other hand, the split-threads 382 are disposed in the mid-section of the threaded section 34. The crest of the thread 382 is wider than that of said regular-thread 381, and has a continuous slit 383 extending throughout its crest portion. Therefore, the thread 382 is capable of being compressed by an amount corresponding to the width 383 of the slit 382.

The action of the special threading system is explained in the following. Before the leg 30 is threaded into the threaded hole 22 of the nut-component 20, the width of the secondary thread 382 is wider than that of the primary thread 381. When the threaded section 34 of the leg 30 is inserted from below and rotated in the threaded hole 22, an upper external thread 381 of the threaded section 34 makes contact with a lower internal thread crest 221 and root 222 of the threaded hole 22. The shape and the pitch of the two threaded sections are identical, and the two parts can be mated properly without any particular care.

Upon continued rotation of the leg 30, external threads of the split-thread section 342 begin to thread into the internal threads of the regular-threads 221 on the threaded hole 22. The profile of the regular-threads 221 is made to fit with that of the regular-threads 381, and therefore, the crest 382 of the split-thread section 342 fits into the root 222 of the regular-thread by compressing the slit 383. The frictional forces, exerted by the elastic spring-back of the slotted thread section 342, prevent loosening of the leg 30 by not allowing the counter rotation of the threads. By adjusting the number of turns of the leg 30, the leg height can be adjusted to an appropriate value to readily achieve the desired height of the floor body 10.

As explained above, the preferred embodiment is able to achieve smooth fitting of the leg 30 into the floor body 10 by providing regular-threads on both the internal threads on threaded hole 22 and the external threads on the leg 30 in the initiating sections of the respective parts. Locking of the leg 30 to the floor body 10 is achieved by the split threads in the midsection of the threaded section 34 on the leg 30 without the use of additional tensioning device such as washers.

That is, the preferred embodiment of this invention demonstrates that, by providing regular-threads 381 on both mating parts, this flooring system ensures good starting fit into each other, thus preventing a possibility of the crest 221 of the regular-threads on the threaded hole 22 biting into the opening 383 of the split-threads 382.

Additionally, since the regular-threads 381 are provided also on the lower section of the threaded section 34, it is possible to attach the leg 30 by inserting said leg from the top side of the floor body 10, or to attach a set of removal tools from the top surface of the panel. This will be explained in more detail in a second embodiment. However, in this preferred embodiment it is sufficient to have the regular-threads 381 only on the starting section of the threaded section 34 regardless of whether said section is disposed on the bottom or the top of the panel body.

In the above preferred embodiment, the regular-threads 381 and the split-threads were provided on the threaded section 34 of the leg 30. The same effects are obtained by having only the regular-threads 381 on the leg 30, and by providing the two types of threads on the internal threads 22 of the nut-component 20, with the regular-thread disposed on at least the initiation portion of said internal thread 22.

A second preferred embodiment will be described below in reference to FIGS 6 to 12.

The floor panels are made of fibre-reinforced cement to provide rapid, simple installation of sectionalized flooring components, of high strength and good fire resistance, to protect the wiring and other installations used in modern so-called "intelligent buildings". Provisions are provided on each slab to faciliate installation of pipings and wirings required for operating the automated office equipment.

Figure 6:
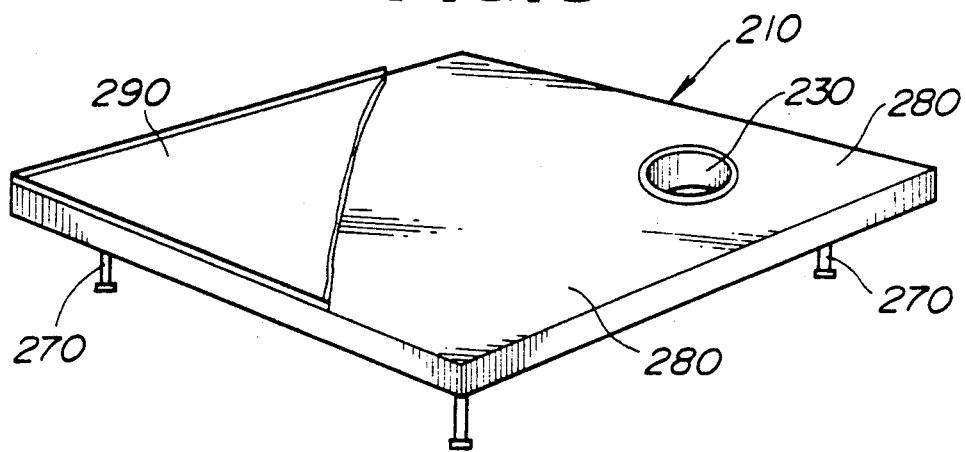
FIG. 6 is an oblique top view of a floor panel in a second preferred embodiment.
Figure 7:
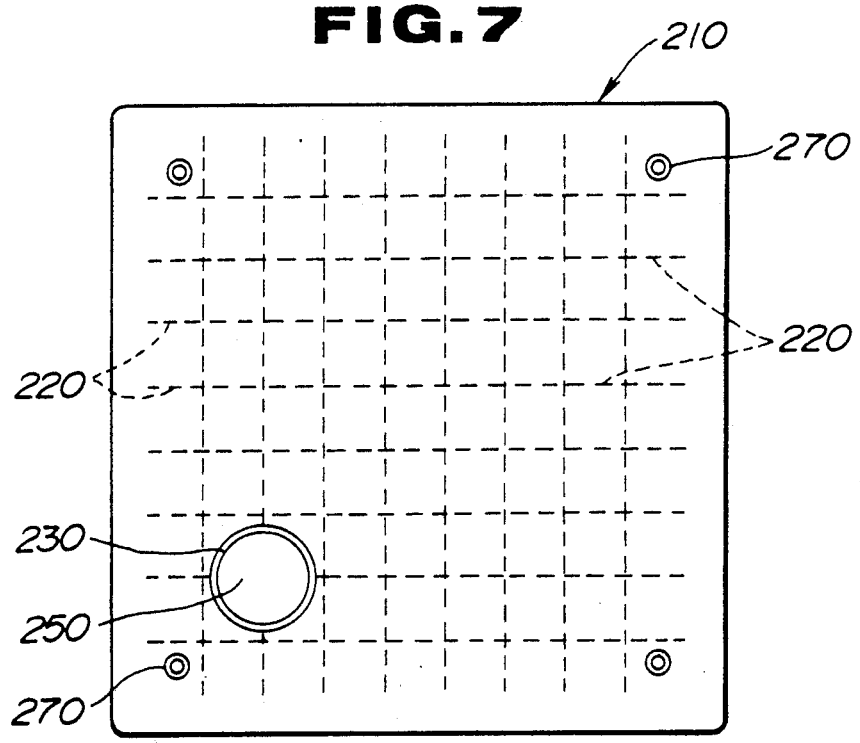
FIG. 7 is a schematic drawing to show the internal reinforcement of the above panel.
Figure 8:
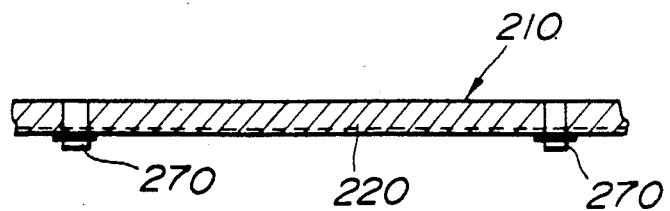
FIG. 8 is a cross sectional view of the second preferred embodiment.

FIG. 6 shows the essential components of a reinforced cement panel in the second preferred embodiment. It comprises a square cement panel body 210, supporting legs 270, an access hole 230 with a cap 250 and a top covering 290. FIG. 7 is a schematic plan view showing a square cement panel body 210, containing a lattice work of reinforcing fibres 220, and a relatively large diameter access hole 230, with an openable cap 250, for the installation of required piping and wiring in the subfloor space (not shown). FIG. 7 illustrates optional relative positioning of the reinforcing lattice work 220, the hole 230 and the support legs 270 at the four corners of the panel body 210.

Figure 9:
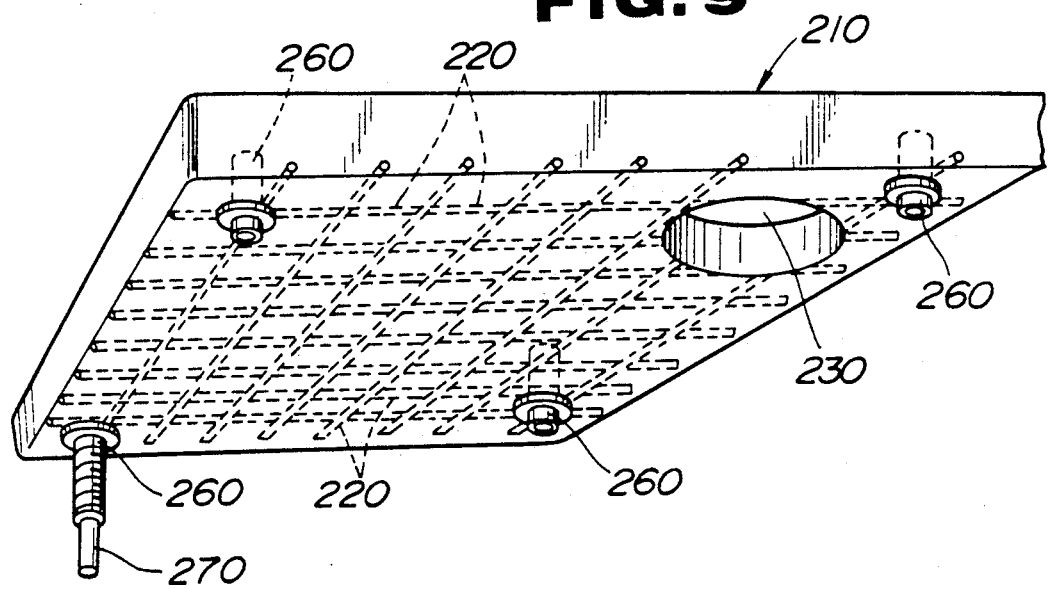
FIG. 9 is an oblique bottom view of the second preferred embodiment.
Figure 10:
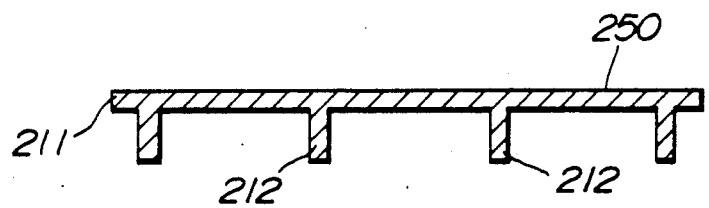
FIG. 10 is a cross sectional view of the openable cap for the access hole in the second preferred embodiment.

FIG. 9 shows an oblique view of the bottom side of the reinforced panel body 210 with latticed reinforcement 220, together with four embedded metal nut-components which are provided to receive four support legs 270. The embedded nut-components provide firm and secure fixation of the support legs for the construction of stable functional floors which add to the general ambience of an office or a room.

Figure 11:
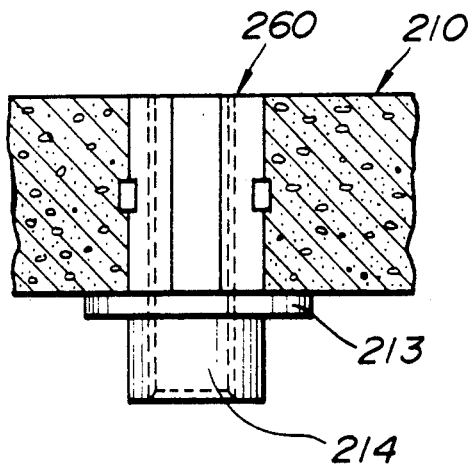
FIG. 11 is a cross sectional view of a metal nut-component in the second preferred embodiment.
Figure 12:
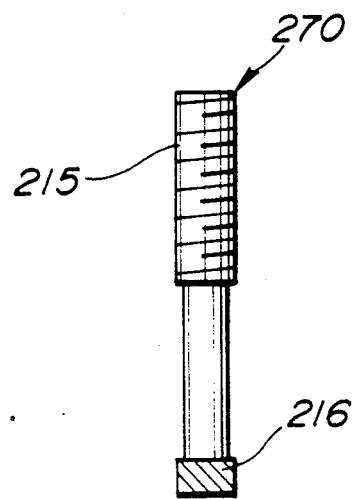
FIG. 12 is a side view of a support leg in the second preferred embodiment.

The support legs 270 are attached to the panel body 210 by means of the arrangement as described in the first preferred embodiment, and the description of mechanisms will not be repeated. The arrangement of the internal and external threads, 214 and 215 respectively, of the nut-component 260 and the support leg 270 are shown in FIGS. 11 and 12.

According to this preferred embodiment, the non-flammable panel is easy to install and remove for renovation, and accommodates design changes readily. Because of the relative weight of cement panels and the reinforcement, the floors constructed with these panels are strong, stable and provide good sound insulation qualities. Levelling of the individual panels can be accomplished with ease as described in the first preferred embodiment.

The access hole 3 are particularly important for use in new buildings in which the use of sophisticated communication equipment is routine, and the attendant wiring and piping needs are complex and frequent.

Finally, the floor panels are covered with decorative covering 290, such as carpeting and rugs, to provide finishing touches and to add elegance to said office or room.

According to this preferred embodiment, the flooring 310 is made of a light inorganic material which can be moulded readily to reproduce complex shapes. The complex-shaped nut-component requires an intimate, firm support to be provided by the attachment component in order to produce a floor that is tight, durable and stable.

This preferred embodiment presents further advantage that, as stated above, the flooring panels are able to maintain long-lasting tight fitting after repeated usage. This is particularly important in modern offices where changes in equipment and arrangement necessitate frequent rewiring and other remodelling activities. The invented flooring panels retain original tightness of fit even after repeated removal and reinstallation without becoming wobbly or unstable.

FRC (fiber reinforced ceramic) matrix of the panel body, and therefore, the nut-component is able to provide firm support to the support legs. Also, the reinforcing mat disposed above the nut-component provides increased strength to the joint and the panel sections of the flooring system.

In this preferred embodiment, the attachments 360 were located on the corners of the panel body, but it should be noted that the number and the locations of the attachment can be flexible, such that they can be located in the center or in the middle of the peripheral regions of the panel body. The choices are dictated by circumstances and their arrangement can be varied to suit particular loading and usage conditions. The corner locations for the panel holes are convenient when it is necessary for the panel to be lifted up for the purpose of rearrangement or servicing. A set of grips designed to the threaded into the threaded holes from the top surface of the panel body is provided for this purpose.

What is claimed is:

1. A flooring system comprising a flooring panel having panel body component, and a detachable support leg component wherein:
   the joining of said components can be effected by means of a female thread formed on each component and a male thread formed on said support leg, at least one of said female thread and said male thread comprising two types of threads to effect a smooth and firm joining of said two components;
   one type of threads consisting of a crest and a root, a set of said crest and said root constituting a spacing of said thread, extending side by side in spiral throughout, said type of threads being referred to as the regular threads;
   and another type of threads of identical spacing but whose crest includes a slit disposed at the tip of the crest in a manner so as to divide said crest into two identical portions, said slit extending throughout said threads, said crest forming a bulge by being wider in its cross-section than the regular threads and being capable of being compressed by an amount corresponding to the width of the slit, said type of threads being referred to as the slit-threads.

2. The flooring system according to claim 1, wherein a mechanical joint is made by threading together a leg component to a panel body component of the flooring system wherein said combination of two thread types disposed on said leg component comprises said regular threads and said split-threads disposed in continuous succession, wherein the leading section of the thread combination is provided with the regular threads.

3. The flooring system according to claim 1, wherein a mechanical joint is made by threading together a leg component to a panel body component of the flooring system wherein said panel component is provided with said two types of threads, consisting of said regular threads and said split-threads, wherein the leading section of the thread is provided with the regular threads.

4. A flooring system according to claim 1, wherein said panel component is made of reinforced ceramic materials, wherein a reinforcing component is a lattice work of reinforcing fibres arranged in a network to provide a load-bearing component.

* * * * *